United States Patent [19]

Sugimoto

[11] 4,241,635

[45] Dec. 30, 1980

[54] HYDRAULIC SYSTEM FOR CONTROLLING SAW-FRAME CUTTING FEED SPEED IN A SAWING MACHINE

[76] Inventor: Tadahiro Sugimoto, 6-8, 4-chome, Minami-Mukonoso, Amagasaki-shi 661, Japan

[21] Appl. No.: 29,739

[22] Filed: Apr. 13, 1979

[51] Int. Cl.[3] ............................................ B23D 53/04
[52] U.S. Cl. ..................................................... 83/800
[58] Field of Search .......................... 83/756, 800, 799

[56] References Cited

U.S. PATENT DOCUMENTS 3,991,644 11/1976 Sugimoto .............................. 83/800

Primary Examiner—J. M. Meister
Attorney, Agent, or Firm—Koda and Androlia

[57] ABSTRACT

A hydraulic system for controlling the cutting feed speed of a saw frame of a sawing machine, such as a band-sawing machine, includes an improved control valve on the discharge line enabling the fluid to draw off from the hydraulic cylinder, the control valve being capable of amplifying changes of pressure in the cylinder occurring in response to changes of cutting resistance to the saw blade, thereby securing a proper control over the cutting feed speed of the saw frame irrespective of the size and weight of the saw frame.

2 Claims, 7 Drawing Figures

HYDRAULIC SYSTEM FOR CONTROLLING SAW-FRAME CUTTING FEED SPEED IN A SAWING MACHINE

BACKGROUND OF THE INVENTION

1. Field of the Invention

This invention relates to a hydraulic system for controlling the cutting feed speed of a saw frame of a sawing machine, such as a band-sawing machine. More particularly, the present invention relates to a hydraulic system for controlling the cutting feed speed of a saw frame in response to changes of cutting resistance to the saw blade occurring in accordance with varied widths of the cut, thereby protecting the saw blade against overloading by the saw frame.

2. Description of the Prior Art

The common practice is to provide a sawing machine with a hydraulic system for controlling the cutting feed speed of a saw frame. Normally two different methods are adopted depending upon the situations; one is that the saw frame is slidably carried on a pair of columns erected on the base, and the other is that it is pivotally supported on the base at its one end while the other end portion is free to move up and down. These two methods are fundamentally identical, in that each has a hydraulic cylinder in which a ram is reciprocated under hydraulic pressure, the ram including a rod fastened to the saw frame. In this system, the saw frame is raised when the oil is pumped into the cylinder from the reservoir, and the same lowers rapidly when the oil is returned to the reservoir. In this case, the conventional system employs a directional valve in the return path, thereby resulting in a direct hydraulic return to the reservoir. But, when the oil is returned to the reservoir through the directional valve and a throttle valve, the lowering speed of the saw frame is very gradual, which is commonly called a cutting feed. This cutting feed is constant irrespective of variations in the cutting width of the work. However, the constant cutting feed speed endangers the saw blade to overloading, and lessens the efficiency.

Therefore, there has arisen a demand in the industry for ensuring an adequate cutting feed speed thereof under hydraulic systems. Many proposals have been made for this purpose, among which is that a control valve is provided in the return path of oil, between a directional valve and the discharge, whereby the oil pressure is reduced from the larger first pressure to the smaller second pressure. In addition, a throttle valve is provided between the control valve and the discharge, so as to ensure that the oil flow can pass the throttle valve at the rate corresponding to the secondary pressure of the control valve. As commonly known in the art, the pressure exerting on the inlet port of the throttle valve is in a proportional relationship with the rate at which the oil passes through the throttle valve. Under this structure, the sum of the pressure in the cylinder and the cutting resistance to the saw blade can be constantly equal to the weight of the saw frame, wherein the "cutting resistance to the saw blade" means a vertical load upon the saw blade. However, the cutting resistance to the saw blade is not always constant. For example, when the work to be cut is an H-beam, the cutting amount changes during the operation, which leads to changes of the cutting resistance to the saw blade. In order to avoid a problem due to changes of cutting resistance, it has been proposed that by detecting changes of cutting resistance to a saw blade as those of the pressure in the cylinder, the discharge of oil in the cylinder is controlled. Thus, when the pressure in the cylinder is high, the exhaust of oil therefrom is increased, thereby speeding up the cutting feed speed of the saw frame. In contrast, when it is low, the exhaust of oil therefrom is reduced, thereby slowing the cutting feed speed of the saw frame. This system is particularly applicable for small-size cutting machines, but when the machines are large-sized, difficulties have been brought about, due to the fact that the saw frame is so heavy for the cutting resistance to the saw blade that responses therefrom are likely to be negated, thereby losing control over the cutting feed speed. This causes damages to the saw blade. For precaution, therefore, it can be proposed that the cutting feed is maintained at a slow speed throughout the operation, but it is inefficient.

In order to avoid such troubles, Japanese Patent Specification Publication No. 52-10748 (published on Mar. 25, 1977) proposes one solution by providing a device for detecting any distortions occurring on the saw blade on each arm supporting the same. However, this method has a drawback that a practicably sensitive signals cannot be expected unless the distance between the pair of arms is considerably long. In addition, the required hydraulic system becomes complicated, thereby resulting in a low responsiveness, and what is more, the coolant supply line and the detecter line are likely to become entangled or twisted, thereby causing troubles during the cutting operation.

U.S. Pat. No. 4,016,787, whose invention was made by the inventor of the present invention, discloses a further expedient for detecting changes of cutting resistance to saw blade as changes of the pressure in the cylinder by means of a piezo-electric element, so as to control the discharge of oil in the cylinder, and therefore to maintain the cutting resistance to the saw blade at an optimum. Nevertheless, it has been found that this method also has drawbacks of complication and expensiveness because of the fact that the system must include an electric system as a controller.

The present invention is directed toward solving these problems pointed out above, and has for its principal object to provide an improved hydraulic system for controlling the cutting feed speed of a saw frame, without the use of any electric means but in the hydraulic system itself.

SUMMARY OF THE INVENTION

According to the present invention, the hydraulic system for controlling the cutting feed speed of a saw frame, includes a control valve capable of amplifying any variations of the hydraulic pressure in the cylinder occurring in response to the increase or decrease of cutting resistance to the saw blade, thereby securing the detection of any variation of the hydraulic pressure irrespective of the weight of the saw frame against the cutting resistance to the saw blade, and thereby securing control over the discharge of oil from the cylinder.

The invention will be more particularly described by way of example with reference to the drawings.

DETAILED DESCRIPTION OF A PREFERRED EMBODIMENT

Figure 1:
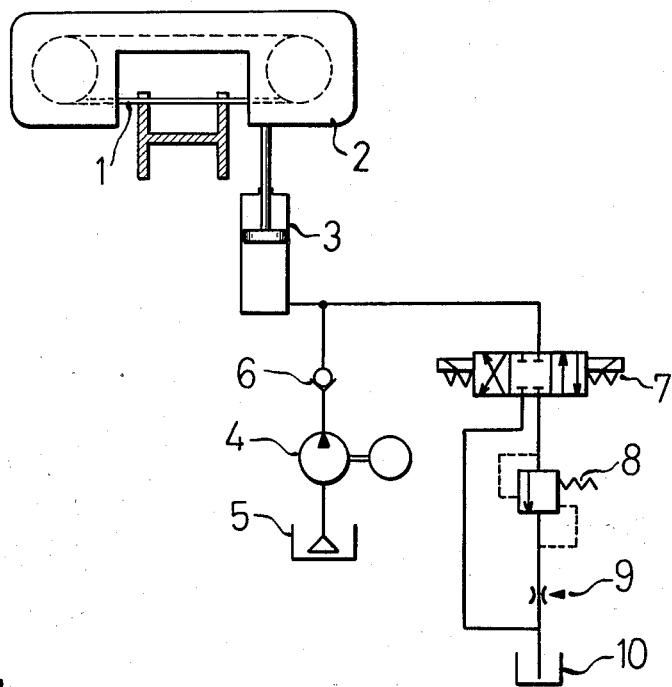
FIG. 1 is a diagrammatic view of a conventional hydraulic system for controlling the cutting feed speed of a saw frame.
Figure 2:
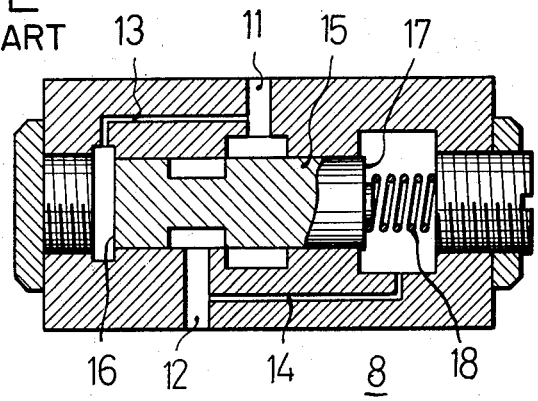
FIG. 2 is a longitudinal section through a conventional type of control valve used in the hydraulic system in FIG. 1.

In order to clearly explain the present invention, reference will firstly be made to the conventional hydraulic system and control valve shown in FIGS. 1 and 2.

An endless band saw 1 is carried on a saw frame 2, and is now cutting an H-beam. The saw frame 2 is supported by a ram which can move up and down under the hydraulic pressure. The hydraulic cylinder 3 is provided with an oil supply line and an oil discharge line. An oil is supplied by means of a pump 4 from a reservoir 5 via a check valve 6 (i.e. the supply line), and it is discharged into the reservoir 5 via a directional valve 7, a control valve 8 and a throttle valve 9 (i.e. the discharge line).

The control valve 8 is shown on an enlarged scale in FIG. 2. Now by referring to it, the basic principle underlying the controlling system will be explained:

In this specification a pressure impinging upon an inlet port 11 will be referred to as the first pressure, indicated as $P_1$ and a pressure impinging upon an outlet port 12 will be as the second pressure, indicated as $P_2$. When the first pressure $P_1$ is impinged upon the inlet port 11, a spool 15 is urged to the right in FIG. 2 against a spring 18, wherein the oil pressure through an oil path 13 exerts on the left-hand end face 16 of the spool 15. When the spool 15 is pushed to the right, the oil is enabled to flow from the inlet port 11 to the outlet port 12 through a ring-shaped recesses 19 and 20. The pressure at the outlet port 12, that is, the second pressure $P_2$ exerts on the right-hand end face 17 of the spool 15 through the oil path 14. When the sum of the working force of the second pressure exerting the end face 17 and the compression force of the spring becomes greater than the working force of the first pressure exerting on the left-hand end face 16, the spool 15 is shifted to the left, thereby stopping the passage of the oil through the recesses 19 and 20. In order to enable the spool to be in equilibrium, the following equation must be satisfied:

$$P_1 A_1 = P_2 A_1 + K \quad (1)$$

$$(P_1 \geq P_2)$$

wherein K is the compression force of the spring 18, and $A_1$ is the cross sectional area of the spool 15.

Therefore, $$P_2 = P_1 - K' \quad (2)$$

wherein $K' = K/A_1$.

From the equation (2), it will be understood that the second pressure $P_2$ is a function of the first pressure $P_1$, that is, the pressure in the hydraulic cylinder 3. It is evident, therefore, that when $P_1$ changes by $\Delta P_1$ in response to the change of cutting resistance to the saw blade, $P_2$ will equally change by $\Delta P_1$·(where $\Delta P_2 = \Delta P_1$).

This controlling system is effectively applicable when the saw frame is relatively light in relation to the cutting resistance to the saw blade. However, if the saw frame is heavy enough to negate any changes of cutting resistance to the saw blade, responsiveness to the controlling system will decrease, thereby causing damages to the saw blade, or at least resulting in the inefficient performance.

For example, when the workpiece is an H-beam which is inherently irregular in cross-section, and if the cutting resistance to the saw blade changes from zero to 100 kg upon this workpiece while the saw frame is 1,000 kg heavy, the ram in the hydraulic cylinder will undergo various loads changing from 1,000 kg to 900 kg. Now, suppose that the working area of the hydraulic cylinder is 100 cm², it will be understood that $P_1$ changes from 10 kg/cm² to 9 kg/cm², and that the differential $\Delta P_1$ is 1 kg/cm², which means only 10% of the maximum value of $P_1$.

Figure 3:
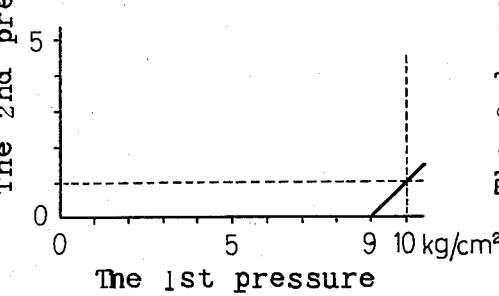
FIGS. 3 and 4 are graphs showing a relationship between the first pressure and the second pressure in the conventional hydraulic system in FIG. 1.
Figure 4:
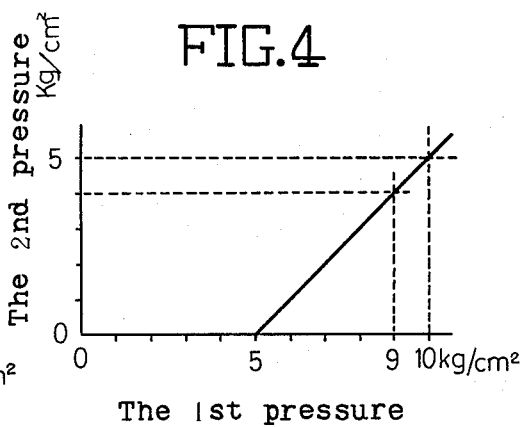

Accordingly, the compression force of the spring 8 will be set to $K' = 9$ kg/cm² (FIG. 3). Then, as is evident from the equation (2), the second pressure $P_2$ will become such a low pressure as from 1 kg/cm² to 0 kg/cm², whereby the discharge of the oil from the cylinder 3 will be retarded. This means that the cutting feed speed will be slow. If the compression force of the spring is set to $K' = 5$ kg/cm² (FIG. 4), $P_2$ will remain almost the same value, staying in the range of 5 to 4 kg/cm² ($\Delta P_2 = \Delta P_1 = 1$ kg/cm²). This means that no appreciable response occurs from the changes of cutting resistance to the saw blade. In either case, the system loses a proper control power.

Figure 5:
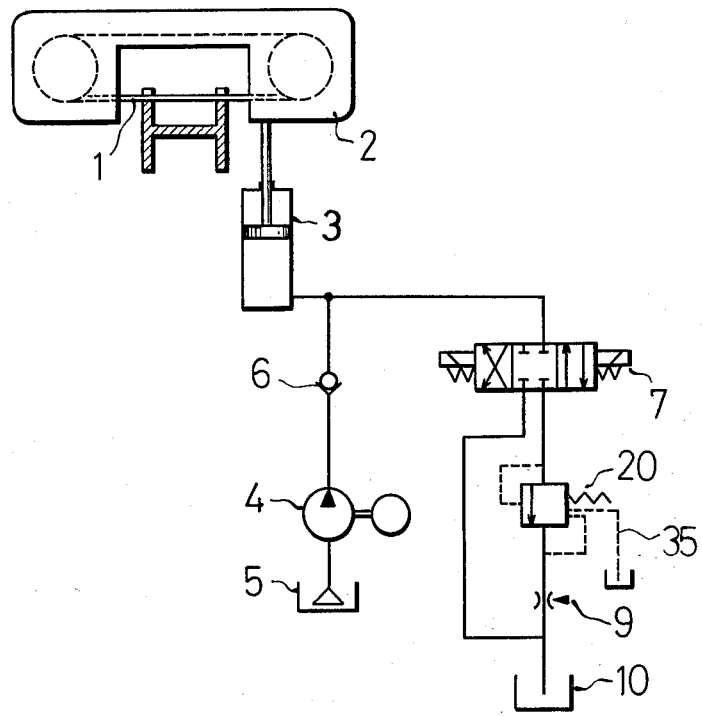
FIG. 5 is a diagrammatic view of the hydraulic system according to the present invention.
Figure 6:
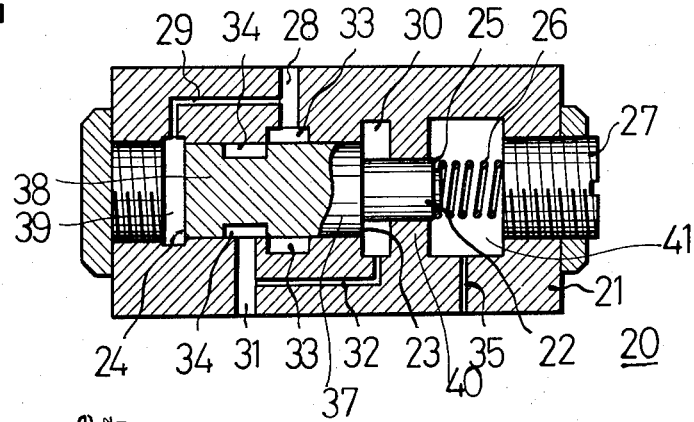
FIG. 6 is a longitudinal section through an improved control valve for use in the hydraulic system shown in FIG. 5.

Referring now to FIG. 5, the controlling system of the present invention will be explained:

The control valve 20 illustrated in FIG. 6 is different from the conventional control valve 8 illustrated in FIG. 2, in that a spool 37 has a body 38 and a head 22 with a shoulder 23 interposed therebetween, wherein the sectional area of the head is smaller than that of the body.

The spool is provided with a second ring-shaped recess 34 in the central portion of the body. The spool 37 is liquid-tightly accommodated in a valve block 21, wherein the body 38 is accommodated in a first bore while the head 22 is accommodated in a second bore whose diameter is smaller than that of the first bore. The spool 37 can slide in the two bores under the urge of hydraulic pressure. The valve block 21 has three chambers and one recess, that is, from the left to the right in FIG. 6, a first pressure chamber 39, a first ring-shaped recess 33, a second pressure chamber 30, and a spring chamber 41. The valve block 21 is provided with an inlet port 28 communicating with the first recess 33 at its top surface, and the inlet port 28 is also connected to the first pressure chamber 39 through an oil path 29 while its open end is connected to the cylinder 3 through a directional valve 7. The valve block 21 is provided with an outlet port 31 communicating with the second recess 34 of the spool at its bottom surface. The outlet port 31 is also connected to the second pressure chamber 30 through an oil path 32 while its open end is connected to the throttle valve 9.

In the spring chamber 41, the spring 26 is mounted so as to push the head 22 of the spool, whose compression force can be adjusted by means of an adjustable screw 27. The spring chamber is provided with a drain port 35 communicating with the reservoir. Under this structure of the control valve, when the oil from the cylinder 3 exerts on the inlet port 28 as the first pressure $P_1$, the spool 37 is shifted to the right against the spring 26 (in FIG. 6), under the urge of oil pressure exerting on the left-hand end face of the spool through the oil path 29. When the spool is shifted to the right, the oil is passed from the inlet port 28 to the outlet port 31 through the united passageway of the recesses 33 and 34. In this way, the pressure at the outlet port 31, that is, the second pressure $P_2$ exerts on the shoulder 23 of the spool 37 through the oil path 32. When the sum of the working force of $P_2$ and the compression force of the spring 26 exceeds the working force of $P_1$, the spool 37 is returned to the left, thereby breaking the united relationship between the two recesses 33 and 34. Thus the passing of oil is stopped, and the second pressure $P_2$ drops against the first pressure $P_1$. In course of this interchange of strength between the first and second hydraulic pressures the spool 37 comes to stay at a position at which the two recesses 33 and 34 overlap with an adequate amount of gap therebetween.

The principle of the controlling system according to the present invention will be explained:

Let the area of the left-hand end face 24 of the spool be $A_1$, and the sectional area of the head 22 be $A_3$. Then, the area of the shoulder 23 will be $(A_1 - A_3)$. In order to place the spool 37 in equilibrium, the following equation must be satisfied:

$$P_1 A_1 = P_2 A_2 + K \quad (3)$$

$(A_1 > A_2, P_1 \geq P_2)$

Therefore, $$P_2 = (P_1 - K') A_1 / A_2 \quad (4)$$

$(K' = K/A_1)$

Figure 7:
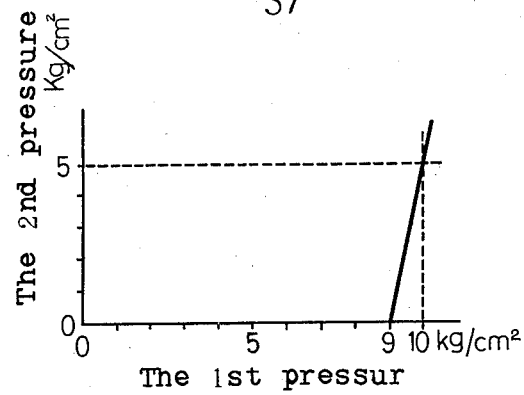
FIG. 7 is a graph showing a relationship between the first pressure and the second pressure under the present invention.

Suppose that the cutting resistance to the saw blade changes from zero to 100 kg, and that the pressure $P_1$ in the cylinder 3 changes from 10 to 9 kg/cm$^2$, wherein the differential $\Delta P_1$ is 1 kg/cm$^2$. Now, let the area of the shoulder $A_2$ be 1/5 of $A_1$, and the constant $A_1/A_2$ will be 5. Then, if the compression force of the spring 26 is set to $K' = 9$ kg/cm$^2$, it will be understood from the equation (4) that the second pressure P will change in a relatively wide range of 5 kg/cm$^2$ to 0 kg/cm$^2$ ($\Delta P_2 = 5$ kg/cm$^2$). In this way, even if they are small, any changes of the pressure in the cylinder will be effectively amplified into an appreciable amount, irrespective of the size and weight of the saw frame. The characteristics of this situation is shown by the graph in FIG. 7. As is evident from the graph, even when a differential of pressure due to changes of cutting resistance to the saw blade is small as compared with the pressure in the cylinder, it will be amplified sufficiently to ensure an adequate control over the cutting feed speed.

What is claimed is:

1. A hydraulic system for controlling the cutting feed speed of a saw frame of a sawing machine, said system including:
    a hydraulic cylinder including a ram supporting said saw frame;
    a discharge line allowing the fluid in said hydraulic cylinder to draw off therefrom, said discharge line including a control valve and a throttle valve;
    said control valve comprising a spool reciprocally moving under the urge of a first hydraulic pressure and a second hydraulic pressure exerting on its first end face and second end face;
    said first end face having a larger pressure receiving area than that of said second end face;
    a spring means backing up said spool at its second end face so as to assist the urge of said second hydraulic pressure exerting on said second end face of spool, thereby amplifying variations in pressure in the hydraulic cylinder due to changes of cutting resistance to the saw blade to carry out a sensitive control of the cutting feed speed of the saw frame.

2. A hydraulic system as set forth in claim 1, further comprising:
    a valve block housing said spool;
    said valve block including an inlet port and an outlet port for allowing a fluid from said hydraulic cylinder to pass therethrough;
    said inlet port and said outlet port having a space interlocated therebetween, said space being divided by said spool housed therein into a first pressure chamber and a second pressure chamber;
    said first pressure chamber being connected to said inlet port and said second pressure chamber being connected to said outlet port;
    said spool including a body and a head, wherein said body has a larger sectional area than said head with a shoulder portion therebetween;
    said spool head being pressed at its top end by means of a spring means whose compression force is adjustable;
    said end face of said spool head and said spring means being located in a spring chamber including a drain port;
    said second pressure chamber being located around said end face of said shoulder portion within said valve block;
    said first pressure chamber being located at said end face of said spool body within said valve block;
    said valve block including a first ring-shaped recess and said spool including a second ring-shaped recess, such that said first and second recesses meet and make a united passageway allowing a fluid to flow from said inlet port to said outlet port; and
    said first ring-shaped recess communicating with said inlet port and said second ring-shaped recess communicating with said outlet port.

* * * * *